United States Patent
Homma et al.

(10) Patent No.: US 8,538,759 B2
(45) Date of Patent: Sep. 17, 2013

(54) SPEECH RECOGNITION SYSTEM AND DATA UPDATING METHOD

(75) Inventors: Takeshi Homma, Fuchu (JP); Hiroaki Kokubo, Higashimurayama (JP); Akinori Asahara, Tachikawa (JP); Hisashi Takahashi, Sagamihara (JP)

(73) Assignee: Clarion Co., Ltd., Tokyo (JP)

( * ) Notice: Subject to any disclaimer, the term of this patent is extended or adjusted under 35 U.S.C. 154(b) by 877 days.

(21) Appl. No.: 12/690,291

(22) Filed: Jan. 20, 2010

(65) Prior Publication Data

US 2010/0185446 A1 Jul. 22, 2010

(30) Foreign Application Priority Data

Jan. 21, 2009 (JP) ................. 2009-010754
Mar. 31, 2009 (JP) ................. 2009-086097

(51) Int. Cl.
*G10L 11/00* (2006.01)
*G10L 21/00* (2006.01)

(52) U.S. Cl.
USPC ......... 704/270.1; 704/251; 704/270; 704/275

(58) Field of Classification Search
USPC ................. 704/251, 270, 270.1, 275, 240
See application file for complete search history.

(56) References Cited

U.S. PATENT DOCUMENTS

| | | | |
|---|---|---|---|
| 4,797,924 A * | 1/1989 | Schnars et al. | 704/275 |
| 5,524,169 A * | 6/1996 | Cohen et al. | 704/231 |
| 5,543,789 A | 8/1996 | Behr et al. | |
| 5,933,804 A * | 8/1999 | Huang et al. | 704/244 |
| 5,970,451 A * | 10/1999 | Lewis et al. | 704/251 |
| 6,230,132 B1 | 5/2001 | Class et al. | |
| 6,272,464 B1 * | 8/2001 | Kiraz et al. | 704/257 |
| 6,360,164 B1 * | 3/2002 | Murayama | 701/420 |
| 6,405,123 B1 | 6/2002 | Rennard et al. | |
| 1,233,407 A1 | 8/2002 | Khan et al. | |
| 6,615,131 B1 | 9/2003 | Rennard et al. | |
| 1,646,037 A1 | 4/2006 | Waters et al. | |
| 7,225,125 B2 * | 5/2007 | Bennett et al. | 704/233 |
| 2006/0122837 A1 * | 6/2006 | Kim et al. | 704/270.1 |
| 2008/0086262 A1 | 4/2008 | Asahara et al. | |
| 2008/0208592 A1 * | 8/2008 | Cross et al. | 704/275 |

FOREIGN PATENT DOCUMENTS

| | | |
|---|---|---|
| EP | 1 233 407 | 8/2002 |
| EP | 1 646 037 | 4/2006 |
| JP | 08-171396 | 7/1996 |
| JP | 2006-317643 | 11/2006 |
| WO | WO 01/61276 | 8/2001 |

* cited by examiner

*Primary Examiner* — Talivaldis Ivars Smits
*Assistant Examiner* — Shaun Roberts
(74) *Attorney, Agent, or Firm* — Antonelli, Terry, Stout & Kraus, LLP.

(57) ABSTRACT

It is provided a speech recognition system installed in a terminal coupled to a server via a network. The terminal holds map data including a landmark. The speech recognition system manages recognition data including a word corresponding to a name of the landmark, and sends update area information and updated time to the server. The server generates, when recognition data of the area of the update area information sent from the terminal has been changed after updated time, difference data between latest recognition data and recognition data of the update area information at a time of the updated time, and sends the generated difference data and map data of the update area information to the terminal. The terminal updates the map data based on the map data sent from the server. The speech recognition system updates the recognition data managed by the terminal based on the difference data.

20 Claims, 17 Drawing Sheets

VERSION 1

| ID | POI NAME | PHONEME STRING | AREA | LATITUDE, LONGITUDE |
|---|---|---|---|---|
| | 東西クリニック (TOZAI CLINIC) | to:zaikuriniqku | A | x, y |
| | 華津温泉 (HANATSU ONSEN) | hanatsuoNseN | B | x, y |
| | 葛西病院 (KASAI BYOIN) | kasaibyo:iN | D | x, y |
| | パークホテル (PARK HOTEL) | pa:kuhoteru | C | x, y |
| | あさってホテル (ASATTE HOTEL) | asaqtehoteru | D | x, y |
| | アルクホテル (ARUKU HOTEL) | arukuhoteru | A | x, y |

FIG.3A

VERSION 2

| ID | POI NAME | PHONEME STRING | AREA | LATITUDE, LONGITUDE |
|---|---|---|---|---|
| | 東西病院 (TOZAI BYOIN) | to:zaibyo:iN | A | x, y |
| | 華津温泉 (HANATSU ONSEN) | hanatsuoNseN | B | x, y |
| | 葛西病院 (KASAI BYOIN) | kasaibyo:iN | D | x, y |
| | パークホテル (PARK HOTEL) | pa:kuhoteru | C | x, y |
| | あさってホテル (ASATTE HOTEL) | asaqtehoteru | D | x, y |

FIG.3B

VERSION 3

| ID | POI NAME | PHONEME STRING | AREA | LATITUDE, LONGITUDE |
|---|---|---|---|---|
|  | 東西病院 (TOZAI BYOIN) | to:zaibyo:iN | A | x, y |
|  | 華津温泉 (HANATSU ONSEN) | hanatsuoNseN | B | x, y |
|  | 葛西病院 (KASAI BYOIN) | kasaibyo:iN | D | x, y |
|  | あさってホテル (ASATTE HOTEL) | asaqtehoteru | D | x, y |
|  | 太閤会計事務所 (TAIKO KAIKEI JIMUSHO) | taiko:kaike:jimusho | C | x, y |

FIG.3C

VERSION 4

| ID | POI NAME | PHONEME STRING | AREA | LATITUDE, LONGITUDE |
|---|---|---|---|---|
|  | 東西病院 (TOZAI BYOIN) | to:zaibyo:iN | A | x, y |
|  | 華津温泉 (HANATSU ONSEN) | hanatsuoNseN | B | x, y |
|  | 葛西病院 (KASAI BYOIN) | kasaibyo:iN | D | x, y |
|  | 東八病院 (TOHACHI BYOIN) | to:hachibyo:iN | A | x, y |
|  | 東西電機 (TOZAI DENKI) | to:zaideNki | C | x, y |
|  | 東海病院 (TOKAI BYOIN) | to:kaibyo:iN | D | x, y |
|  | アークホテル (ARC HOTEL) | a:kuhoteru | D | x, y |

FIG.3D

| POI NAME | VERSION | AREA | CONFUSION INFORMATION | | |
|---|---|---|---|---|---|
| | | | CONFUSION POI NAME | VERSION-AREA | CONFUSION SCORE |
| 東西病院 (TOZAI BYOIN) | 2, 3, 4 | A | 東海病院(TOKAI BYOIN) | 4-D | 0.7 |
| | | | 葛西病院(KASAI BYOIN) | 1-D, 2-D, 3-D | 0.7 |
| | | | 葛西病院(KASAI BYOIN) | 4-D | 0.5 |
| | | | 東八病院(TOHACHI BYOIN) | 4-A | 0.6 |
| | | | 東西クリニック(TOZAI CLINIC) | 1-A | 0.2 |
| | | | 東西電機(TOZAI DENKI) | 4-C | 0.1 |
| 葛西病院 (KASAI BYOIN) | 1, 2, 3, 4 | D | 東西病院(TOZAI BYOIN) | 2-A, 3-A, 4-A | 0.8 |
| | | | 東八病院(TOHACHI BYOIN) | 4-A | 0.6 |
| | | | 東海病院(TOKAI BYOIN) | 4-D | 0.5 |
| 東八病院 (TOHACHI BYOIN) | 4 | A | 東西病院(TOZAI BYOIN) | 2-A, 3-A, 4-A | 0.3 |
| | | | 東海病院(TOKAI BYOIN) | 4-D | 0.7 |
| | | | 葛西病院(KASAI BYOIN) | 1-D, 2-D, 3-D, 4-D | 0.7 |
| 東海病院 (TOKAI BYOIN) | 4 | D | 東西病院(TOZAI BYOIN) | 2-A, 3-A, 4-A | 0.6 |
| | | | 東八病院(TOHACHI BYOIN) | 4-A | 0.7 |
| | | | 葛西病院(KASAI BYOIN) | 1-D, 2-D, 3-D, 4-D | 0.5 |
| 華津温泉 (HANATSU ONSEN) | 1, 2, 3, 4 | B | アークホテル(ARC HOTEL) | 4-D | 0.4 |
| パークホテル (PARK HOTEL) | 1, 2 | C | アークホテル(ARC HOTEL) | 4-D | 0.2 |
| | | | あさってホテル (ASATTE HOTEL) | 1-D, 2-D, 3-D | 0.3 |
| アークホテル (ARC HOTEL) | 4 | D | パークホテル(PARK HOTEL) | 1-C, 2-C | 0.2 |
| | | | あさってホテル (ASATTE HOTEL) | 1-D, 2-D, 3-D | 0.2 |
| | | | アルクホテル(ARUKU HOTEL) | 1-A | 0.7 |
| あさってホテル (ASATTE HOTEL) | 1, 2, 3 | D | パークホテル(PARK HOTEL) | 1-C, 2-C | 0.4 |
| | | | アルクホテル(ARUKU HOTEL) | 1-A | 0.1 |
| 東西クリニック (TOZAI CLINIC) | 1 | A | 東海病院(TOKAI BYOIN) | 4-D | 0.1 |
| ... | ... | ... | ... | ... | ... |

FIG.4

TABLE OF POI NAME TO DELETE
7010

| NAME |
|---|
| あさってホテル<br>(ASATTE HOTEL) |

*FIG.9A*

TABLE OF POI NAME TO ADD

| POI NAME | VERSION | AREA | CONFUSION INFORMARION | | |
|---|---|---|---|---|---|
| | | | CONFUSION POI NAME | VERSION-AREA | CONFUSION SCORE |
| 東海病院<br>(TOKAI BYOIN) | 4 | D | 東西病院<br>(TOZAI BYOIN) | 2-A, 3-A, 4-A | 0.6 |
| | | | 東八病院<br>(TOHACHI BYOIN) | 4-A | 0.7 |
| | | | 葛西病院<br>(KASAI BYOIN) | ~~1-D, 2-D,~~ 3-D, 4-D | 0.5 |
| アークホテル<br>(ARC HOTEL) | 4 | D | パークホテル<br>(PARK HOTEL) | ~~1-C,~~ 2-C | 0.2 |
| | | | ~~あさってホテル~~<br>~~(ASATTE HOTEL)~~ | ~~1-D, 2-D, 3-D~~ | ~~0.2~~ |
| | | | ~~アルクホテル~~<br>~~(ARUKU HOTEL)~~ | ~~1-A~~ | ~~0.7~~ |

*FIG.9B*

TABLE OF POI WITH CHANGING CONFUSION INFORMATION

| POI NAME | VERSION | AREA | CONFUSION INFORMATION ||||
|---|---|---|---|---|---|---|
| | | | KIND OF UPDATE | CONFUSION POI NAME | VERSION-AREA | CONFUSION SCORE |
| 東西病院 (TOZAI BYOIN) | 2, 3, 4 | A | ADD | 東海病院 (TOKAI BYOIN) | 4-D | 0.7 |
| | | | UPDATE | 葛西病院 (KASAI BYOIN) | 4-D | 0.5 |
| 葛西病院 (KASAI BYOIN) | 1, 2, 3, 4 | D | ADD | 東海病院 (TOKAI BYOIN) | 4-D | 0.5 |
| 東八病院 (TOHACHI BYOIN) | 4 | A | ADD | 東海病院 (TOKAI BYOIN) | 4-D | 0.7 |
| 華津温泉 (HANATSU ONSEN) | 1, 2, 3, 4 | B | ADD | アークホテル (ARC HOTEL) | 4-D | 0.4 |
| パークホテル (PARK HOTEL) | 1, 2 | C | ADD | アークホテル (ARK HOTEL) | 4-D | 0.2 |
| | | | ~~DELETE~~ | ~~あさってホテル (ASATTE HOTEL)~~ | ~~1-D, 2-D, 3-D~~ | ~~0.3~~ |
| ~~東西クリニック (TOZAI CLINIC)~~ | ~~1~~ | ~~A~~ | ~~ADD~~ | ~~東海病院 (TOZAI BYOIN)~~ | ~~4-D~~ | ~~0.1~~ |

*FIG.9C*

BEFORE UPDATE

| POI NAME | VERSION-AREA | CONFUSION INFORMATION |||
|---|---|---|---|---|
| | | CONFUSION POI NAME | VERSION-AREA | CONFUSION SCORE |
| 東西病院 (TOZAI BYOIN) | 3-A | 葛西病院 (KASAI BYOIN) | 3-D | 0.7 |
| 華津温泉 (HANATSU ONSEN) | 3-B | - | - | - |
| 葛西病院 (KASAI BYOIN) | 3-D | 東西病院 (TOZAI BYOIN) | 3-A | 0.8 |
| パークホテル (PARK HOTEL) | 2-C | あさってホテル (ASATTE HOTEL) | 3-D | 0.3 |
| あさってホテル (ASATTE HOTEL) | 3-D | パークホテル (PARK HOTEL) | 2-C | 0.4 |

*FIG.10A*

DELETION

| POI NAME | VERSION-AREA | CONFUSION INFORMATION |||
| --- | --- | --- | --- | --- |
| | | CONFUSION POI NAME | VERSION-AREA | CONFUSION SCORE |
| 東西病院 (TOZAI BYOIN) | 3-A | 葛西病院 (KASAI BYOIN) | 3-D | 0.7 |
| 華津温泉 (HANATSU ONSEN) | 3-B | - | - | - |
| 葛西病院 (KASAI BYOIN) | 3-D | 東西病院 (TOZAI BYOIN) | 3-A | 0.8 |
| パークホテル (PARK HOTEL) | 2-C | ~~あさってホテル (ASATTE HOTEL)~~ | ~~3-D~~ | ~~0.3~~ |
| ~~あさってホテル (ASATTE HOTEL)~~ | ~~3-D~~ | ~~パークホテル (PARK HOTEL)~~ | ~~2-C~~ | ~~0.4~~ |

*FIG.10B*

ADDING

| POI NAME | VERSION-AREA | CONFUSION INFORMATION |||
| --- | --- | --- | --- | --- |
| | | CONFUSION POI NAME | VERSION-AREA | CONFUSION SCORE |
| 東西病院 (TOZAI BYOIN) | 3-A | 葛西病院 (KASAI BYOI) | 3-D | 0.7 |
| 華津温泉 (HANATSU ONSEN) | 3-B | - | - | - |
| 葛西病院 (KASAI BYOIN) | 4-D | 東西病院 (TOZAI BYOIN) | 3-A | 0.8 |
| パークホテル (PARK HOTEL) | 2-C | - | - | - |
| 東海病院 (TOKAI BYOIN) | 4-D | 東西病院 (TOZAI BYOIN) | 2-A, 3-A, 4-A | 0.6 |
| | | 東八病院 (TOHACHI BYOIN) | 4-A | 0.7 |
| | | 葛西病院 (KASAI BYOIN) | 4-D | 0.5 |
| アークホテル (ARC HOTEL) | 4-D | パークホテル (PARK HOTEL) | 2-C | 0.2 |

*FIG.10C*

DELETING THE CONFUSION INFORMATION THAT HAS NO
RELATIONSHIP WITH ANY POI NAME DATA IN THE TERMINAL

| POI NAME | VERSION AREA | CONFUSION INFORMATION |||
| --- | --- | --- | --- | --- |
| | | CONFUSION POI NAME | VERSION-AREA | CONFUSION SCORE |
| 東西病院 (TOZAI BYOIN) | 3-A | 葛西病院 (KASAI BYOIN) | 3-D | 0.7 |
| 華津温泉 (HANATSU ONSEN) | 3-B | - | - | - |
| 葛西病院 (KASAI BYOIN) | 4-D | 東西病院 (TOZAI BYOIN) | 3-A | 0.8 |
| パークホテル (PARK HOTEL) | 2-C | - | - | - |
| 東海病院 (TOKAI BYOIN) | 4-D | 東西病院 (TOZAI BYOIN) | ~~2-A,~~ 3-A, ~~4-A~~ | 0.6 |
| | | ~~東八病院 (TOHACHI BYOIN)~~ | ~~4-A~~ | ~~0.7~~ |
| | | 葛西病院 (KASAI BYOIN) | 4-D | 0.5 |
| アークホテル (ARK HOTEL) | 4-D | パークホテル (PARK HOTEL) | 2-C | 0.2 |

FIG.10D

UPDATING THE CONFUSION INFORMATION OF POI NAME DATA IN THE TERMINAL

| POI NAME | VERSION-AREA | CONFUSION INFORMATION | | | |
|---|---|---|---|---|---|
| | | CONFUSION POI NAME | VERSION-AREA | CONFUSION SCORE | |
| 東西病院 (TOZAI BYOIN) | 3-A | 葛西病院 (KASAI BYOIN) | 4-D | 0.5 | (UPDATE) |
| | | 東海病院 (TOKAI BYOIN) | 4-D | 0.7 | (ADD) |
| 華津温泉 (HANATSU ONSEN) | 3-B | アークホテル (ARC HOTEL) | 4-D | 0.4 | (ADD) |
| 葛西病院 (KASAI BYOIN) | 4-D | 東西病院 (TOZAI BYOIN) | 3-A | 0.8 | |
| | | 東海病院 (TOKAI BYOIN) | 4-D | 0.5 | (ADD) |
| パークホテル (PARK HOTEL) | 2-C | アークホテル (ARC HOTEL) | 4-D | 0.2 | (ADD) |
| 東海病院 (TOKAI BYOIN) | 4-D | 東西病院 (TOZAI BYOIN) | 3-A | 0.6 | |
| | | 葛西病院 (KASAI BYOIN) | 4-D | 0.5 | |
| アークホテル (ARK HOTEL) | 4-D | パークホテル (PARK HOTEL) | 2-C | 0.2 | |
| ~~東八病院 (TOHACHI BYOIN)~~ | ~~4-A~~ | ~~東海病院 (TOKAI BYOIN)~~ | ~~4-D~~ | ~~0.7~~ | |

FIG.10E

|  |  | CONFUSION INFORMATION | | |
|---|---|---|---|---|
| POI NAME | VERSION-AREA | CONFUSION POI NAME | VERSION-AREA | CONFUSION SCORE |
| 東西病院 (TOZAI BYOIN) | 3-A | 葛西病院 (KASAI BYOIN) | 3-D | 0.7 |
| 華津温泉 (HANATSU ONSEN) | 3-B | - | - | - |
| 葛西病院 (KASAI BYOIN) | 4-D | 東西病院 (TOZAI BYOIN) | 3-A | 0.8 |
| パークホテル (PARK HOTEL) | 2-C | - | - | - |
| 東海病院 (TOKAI BYOIN) | 4-D | 東西病院 (TOZAI BYOIN) | 3-A | 0.6 |
|  |  | 葛西病院 (KASAI BYOIN) | 4-D | 0.5 |
| アークホテル (ARK HOTEL) | 4-D | パークホテル (PARK HOTEL) | 2-C | 0.2 |

*FIG.12A*

|  |  | CONFUSION INFORMATION | | |
|---|---|---|---|---|
| POI NAME | VERSION-AREA | CONFUSION POI NAME | VERSION-AREA | CONFUSION SCORE |
| 東西病院 (TOZAI BYOIN) | 3-A | 葛西病院 (KASAI BYOIN) | 3-D | 0.7 |
|  |  | 東海病院 (TOKAI BYOIN) | 4-D | 0.6 |
| 華津温泉 (HANATSU ONSEN) | 3-B | - | - | - |
| 葛西病院 (KASAI BYOIN) | 4-D | 東西病院 (TOZAI BYOIN) | 3-A | 0.8 |
|  |  | 東海病院 (TOKAI BYOIN) | 4-D | 0.5 |
| パークホテル (PARK HOTEL) | 2-C | アークホテル (ARK HOTEL) | 4-D | 0.2 |
| 東海病院 (TOKAI BYOIN) | 4-D | 東西病院 (TOZAI BYOIN) | 3-A | 0.6 |
|  |  | 葛西病院 (KASAI BYOIN) | 4-D | 0.5 |
| アークホテル (ARK HOTEL) | 4-D | パークホテル (PARK HOTEL) | 2-C | 0.2 |

*FIG.12B*

SPEECH RECOGNITION SYSTEM AND DATA UPDATING METHOD

CLAIM OF PRIORITY

The present application claims priority from Japanese patent applications JP 2009-010754 filed on Jan. 21, 2009 and JP 2009-086097 filed on Mar. 31, 2009, the contents of which are hereby incorporated by reference into this application.

BACKGROUND OF THE INVENTION

This invention relates to a speech recognition system, and more particularly, to a technology for providing, in the latest state, a user with recognition error patterns of a speech recognition system used in a navigation device.

A speech recognition system used in a car navigation device has an advantage of enabling operations on the device without constraining hands and eyes. Especially, car navigation devices offering a function of receiving a point of interest (POI) name uttered by a user as a speech input to thereby set a destination are in the market.

However, when a large number of words are registered in a dictionary of speech recognition held by the speech recognition system, sets of words causing recognition errors tend to occur, resulting in a lower possibility of recognition of a destination from an utterance of a user. To address this problem, JP 08-171396 A discloses a method in which tendencies of recognition errors among phonemes are obtained in advance, and, based on the tendencies, a result of performing error correction on an originally obtained recognition result based on the tendencies of recognition errors is added to a speech recognition result. Moreover, a method of, using tendencies of recognition errors, adding words other than words registered in a dictionary of speech recognition to a speech recognition result, is disclosed (see T. Fukada and Y. Sagisaka, "Automatic generation of a pronunciation dictionary based on a pronunciation network", Proc. Eurospeech 1997, pp. 2471-2472, for example).

Further, JP 2006-317643 A discloses a technology of updating a map with a decreased data traffic by sending difference data of map data for a specific area from a navigation server (hereinafter, referred to as server) to a navigation terminal (hereinafter, referred to as terminal) via a network.

Still further, Shikano, et al., "Speech recognition system", Ohmsha, 2001, describes a method of speech recognition.

SUMMARY OF THE INVENTION

When an update is carried out based on a difference of map data sent from the server to the terminal via the network, the difference of the map data almost always contains addition, update, and deletion of point of interest (POI) names.

When a POI name in the map data is changed, a word of the POI name in the dictionary of the speech recognition system is accordingly to be changed. Then, when the word of the speech recognition system is changed, a set of words having tendencies to cause recognition errors may be generated out of the changed words and existing words, and it is necessary to reexamine the tendencies of recognition errors.

Moreover, it is necessary to consider the following problems when the difference data is sent to the speech recognition system and the tendencies of recognition errors are acquired.

First, for acquiring the tendencies of recognition errors, due to the limited computer resources on the terminal, it is difficult to newly calculate the tendencies of recognition errors only by processing on the terminal. Moreover, when the tendencies of recognition errors are calculated only by the server and sent to respective terminals, the respective terminals hold different versions of a map, and contents of words registered in the recognition dictionary varies from terminal to terminal because the server cannot manage version information of the map of all the terminals. Therefore, it is difficult to acquire the tendencies of recognition errors only on the server.

Incidentally, the speech recognition system is known to carry out, in response to a speech input as a result of an utterance of a user, processing of outputting only one recognition result or processing of outputting a plurality of candidates. Moreover, to each candidate output by the speech recognition system, a score indicating a likelihood of the result is added. Even if a recognition result having the highest score is incorrect, by outputting a plurality of candidates, a possibility that the candidates include a correct answer increases. However, the speech recognition processing of outputting a plurality of candidates requires more computer resources, and the number of candidates to be output is limited when the processing is carried out only on the terminal.

This invention has been made to solve the problems described above, and therefore has an object to send difference data generated as a result of update of map data to a speech recognition system, to acquire tendencies of recognition errors, and to output a recognition result of higher accuracy to a user, and also to provide a mechanism which does not impose excessive loads on servers, terminals, and networks.

A representative aspect of this invention is as follows. That is, there is provided a speech recognition system installed in a terminal coupled to a server via a network. The terminal holds map data including a landmark. The speech recognition system manages recognition data including a word corresponding to a name of the landmark included in the held map data, and sends update area information indicating an area of the map data to be updated and updated time on the area indicated by the update area information to the server. The server generates, in a case of which recognition data of the area indicated by the update area information sent from the terminal has been changed after a time indicated by the updated time sent from the terminal, difference data between latest recognition data and recognition data corresponding to the area indicated by the update area information at a time indicated by the updated time and sends the generated difference data to the terminal along with map data on the area indicated by the update area information. The terminal updates the map data held in the terminal based on the map data sent from the server. The speech recognition system updates the recognition data managed by the terminal based on the difference data sent from the server.

According to this invention, when the map data has been changed, the dictionary in the terminal may be updated using limited computer resources (such as CPU and memory) and network resources.

BRIEF DESCRIPTION OF THE DRAWINGS

The present invention can be appreciated by the description which follows in conjunction with the following figures, wherein:

FIGS. 3A to 3D are explanatory diagrams illustrating examples of data included in a POI name data according to the first embodiment of this invention;

FIG. 4 is an explanatory diagram illustrating an example of a confusion score table according to the first embodiment of this invention;

FIG. 9A is an explanatory diagram illustrating a table of POI name to delete included in difference data sent from the server to the terminal according to the first embodiment of this invention;

FIG. 9B is an explanatory diagram illustrating a table of POI name to add included in the difference data sent from the server to the terminal according to the first embodiment of this invention;

FIG. 9C is an explanatory diagram illustrating a table of information indicating POI names with changing confusion information according to the first embodiment of this invention;

FIGS. 10A to 10E are explanatory diagrams illustrating examples of the POI name data according to the first embodiment of this invention;

FIGS. 12A and 12B are explanatory diagrams illustrating examples of the POI name data according to a second embodiment of this invention.

DETAILED DESCRIPTION OF THE PREFERRED EMBODIMENTS

Hereinbelow, a description is given of embodiments of this invention referring to the accompanying drawings. The descriptions of these embodiments are given of a case in which a dictionary of speech recognition relating to recognition of point of interest (POI) names is updated on a car navigation device. However, the embodiments can be applied to updates of other dictionaries than that of the POI names, the dictionaries being used for operations of the speech recognition for names of music pieces, addresses, intersections, and roads, and speech commands for operating devices. Moreover, a communication terminal is not limited to a car navigation device, and may be a portable navigation device (PND), a cellular phone, a PDA, and the like.

First Embodiment

System Overview (Server and Terminals)

Figure 1:
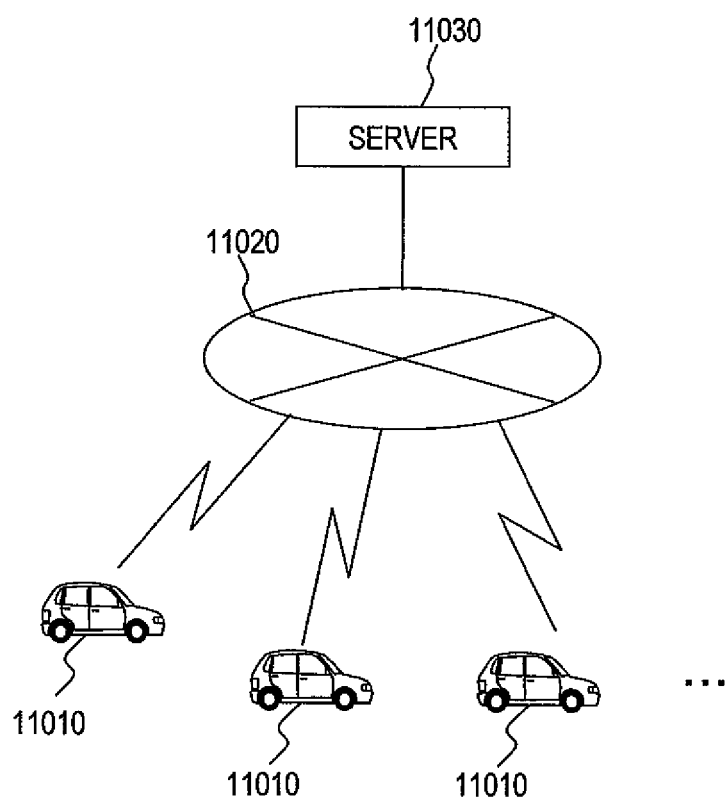
FIG. 1 is a system configuration diagram illustrating a relationship between car navigation terminals and a server according to a first embodiment of this invention.

FIG. 1 is a system configuration diagram illustrating a relationship between car navigation terminals and a server according to a first embodiment of this invention.

Each of a plurality of motor vehicles 11010 is provided with the car navigation terminal. A communication unit of the each motor vehicle 11010 communicates with a server 11030 via a network 11020.

(Configuration of Server)

Figure 2:
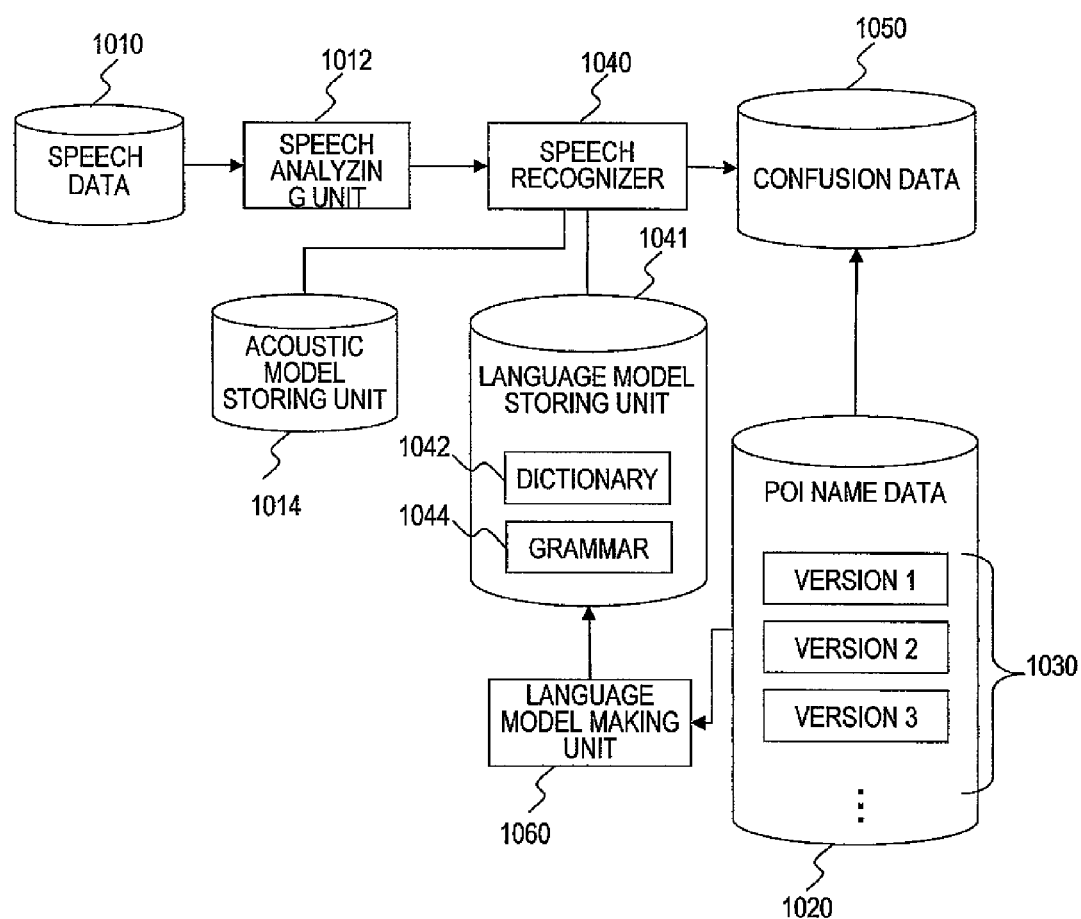
FIG. 2 is a block diagram illustrating a configuration of a server according to the first embodiment of this invention.

FIG. 2 is a block diagram illustrating a configuration of the server 11030 according to the first embodiment of this invention.

The server 11030 is a computer including a CPU, an output device, an input device, a network interface, a memory, and an auxiliary storage system, and communicates with the terminals on the motor vehicles 11010 via the network 11020. In the memory, programs for realizing a speech analyzing unit 1012, a speech recognizer 1040, and a language model making unit 1060 are stored. Moreover, in the auxiliary storage system, speech data 1010, an acoustic model storing unit 1014, a language model storing unit 1041, confusion data 1050, and POI name data 1020 are stored.

In the speech data 1010, speech data pieces of various uttered POI names are stored in advance. Moreover, in the speech data 1010, speech data obtained when each of POIs uttered respectively by a plurality of persons is stored. This speech data may be speeches uttered by different speakers or speeches uttered by the same speaker a plurality of times. Moreover, speech data pieces sampled in different noise environments may be stored.

The speech analyzing unit 1012 converts data of a speech uttered by a user into a sequence of feature vectors. The sequence of feature vectors is obtained by representing, at respective time points, feature amounts of a speech delimited in terms of time as multidimensional vectors, and arranging them in a time sequence. For example, the sequence of feature vectors is obtained by delimiting input speech data into sections of several tens of milliseconds, converting the speech data at the respective time points into multidimensional vectors referred to as mel frequency cepstrum coefficient (MFCC) parameters, and arranging the vectors obtained through the conversion in a time sequence.

The acoustic model storing unit 1014 stores acoustic models corresponding to respective phonemes in advance. As a representation form of this acoustic model, the hidden Markov model (HMM) which defines each phoneme in three states may be employed.

The language model storing unit 1041 stores a dictionary 1042 and a grammar 1044. The dictionary 1042 stores words to be recognized in the speech recognition, and phoneme strings of the words to be recognized. The grammar 1044 stores connection rules of the respective words stored in the dictionary 1042.

The speech recognizer 1040 carries out speech recognition processing. Specifically, the speech recognizer 1040 searches an HMM network formed by connecting HMMs stored in the acoustic model storing unit 1014 according to the dictionary 1042 and connection rules of the grammar 1044 stored in the language model storing unit 1041 for a sequence of states in which a sequence of feature vectors of an input speech transferred from the speech analyzing unit 1012 is output at the highest probability. Further, the speech recognizer 1040 outputs a word sequence following the sequence of states obtained as a search result as a recognition result. Moreover, in addition to the word sequence, the speech recognizer 1040 calculates a score representing the likelihood of the word sequence as the recognition result. The speech recognition processing may be implemented by a method described in Shikano, et al., "Speech recognition system", Ohmsha, 2001. The output word sequence and score are stored in the confusion data 1050. On this occasion, a word sequence having the highest score or a plurality of word sequences having higher scores from the top may be output.

The POI name data 1020 contains data 1030 of POI names at various times and dates.

FIGS. 3A to 3D are explanatory diagrams illustrating examples of the data 1030 included in the POI name data 1020 according to the first embodiment of this invention.

The POI name data 1020 contains data 1030 of POI names at a plurality of dates and times. This example includes a set of four versions (FIGS. 3A to 3D) of the data 1030 of the POI names in the chronological order. This set is managed according to version numbers. According to this embodiment, in an order from the oldest one, there are data 2010 of POI names of version 1 (FIG. 3A), data 2080 of POI names of version 2 (FIG. 3B), data 2090 of POI names of version 3 (FIG. 3C), and data 2100 of POI names of version 4 (FIG. 3D). In place of the version number, creation time and date of the data may be assigned as the management number.

The data 1030 of POI names of each version contains IDs 2030, POI names 2040, phoneme strings 2050, areas 2060, and latitudes/longitudes 2070. The ID 2030 is a unique identifier for identifying a POI name. The phoneme string 2050 is data representing how the POI name 2040 is read. The area 2060 is data for identifying an area on a map containing the POI name. The latitude/longitude 2070 represents the position of this POI. It should be noted that, in addition to these records, a POI category, an address, a phone number, and a Alphabet string to be referred to when the name is input using a touch panel or remote controller, which are usually assigned to a POI in a car navigation device, may be added. Moreover, the area 2060 is not essential, and the area 2060 may be derived by predetermined calculation from the latitude/longitude 2070 if necessary.

Moreover, according to the first embodiment, both the server 11030 and the terminal use the POI name data 1020. Though the POI name 2040 is used as an index key for search, the ID 2030 which is uniquely assigned to the POI name may be used as the index key.

Again, a description is given referring to FIG. 2.

The language model making unit 1060 converts the phoneme strings of the POI names stored in the POI name data 1020 into a language model in a form to be used for the speech recognition, and stores the language model obtained through the conversion in the language model storing unit 1041.

The speech recognizer 1040 recognizes, based on the language model produced by the language model making unit 1060 from the phoneme strings 2050 of the POI names contained in the POI name data 1020, various speech data pieces contained in the speech data 1010, calculates tendencies of recognition errors of the respective speech data pieces, and updates the confusion data 1050 using the calculated recognition results.

Though there are a plurality of possible methods of calculating the tendency of a recognition error, a description is given of one of them as an example.

As the example, tendencies of recognition errors of speech data of a POI name "Asatte Hotel" and speech data of a POI name "Park Hotel" are to be obtained. In the following section, correct recognition of speech data uttered by a user by a speech recognition system as the user intended is referred to as correct answer, the POI name recognized in the event of the correct answer ("Asatte Hotel" in this example) is referred to as correct name, and the POI name incorrectly recognized with respect to the speech data ("Park Hotel" in this example) is referred to as error name.

It is assumed that there exist, in advance, N pieces of speech data obtained when users utter "Asatte Hotel". The speech data may be speeches uttered by a plurality of persons, or speeches uttered by the same person a plurality of times.

Then, log probabilities of the respective speech data pieces with respect to the correct name "Asatte Hotel" and the error name "Park Hotel" are calculated. The log probability is obtained by calculating a logarithm of a probability that a sequence of feature vectors of a certain speech data X is generated from an acoustic model of a phoneme string forming a certain POI name W. As a method of this calculation, a method described in Shikano, et al., "Speech recognition system", Ohmsha, 2001 may be employed. Moreover, the log probability of the speech data X with respect to the POI name W is represented as a notation P(X|W).

Then, a difference between a log probability of the each speech data obtained when the user utters "Asatte Hotel" with respect to the correct name "Asatte Hotel" and a log probability of this speech data with respect to the error name "Park Hotel" is obtained. A difference Di between the log probabilities calculated for the i-th speech data is obtained by the following equation.

$$Di = P(Xi|Wtgt) - P(Xi|Wret)$$

where respective notations have the following meanings.
i: number of speech data (i=1 to N)
Xi: i-th speech data
Wtgt: error name
Wref: correct name When Di is positive, the log probability of the speech data with respect to the error name "Park Hotel" is higher than that with respect to the correct name "Asatte Hotel". Thus, as the number of speech data pieces which give a positive Di is large, the speech data "Asatte Hotel" has a higher tendency to cause a recognition error as the error name "Park Hotel".

Thus, a value obtained by dividing the number of the speech data pieces which give a positive Di by the number of all the speech data pieces is used to represent a tendency of occurrence of a recognition error. The tendency of occurrence of a recognition error is referred to as confusion score hereinafter. According to this method, the confusion score C(Ltgt|Lret) of an error name Ltgt with respect to the correct name Lref is represented by the following equation.

$$C(Ltgt|Lret) = (nDi > 0)/N$$

where nDi>0 denotes the number of the speech data pieces which give the positive difference Di between the log probabilities among the N speech data pieces.

For example, when there are 100 speech data pieces obtained when "Asatte Hotel" is uttered, and log probabilities of these speech data pieces are calculated with respect to both the POI names "Asatte Hotel" and "Park Hotel", there are 30 speech data pieces having a higher log probability with respect to "Park Hotel" than that with respect to "Asatte Hotel". In this case, the confusion score is calculated as 30/100=0.3. Moreover, using the same method, the confusion score of a POI name "Arc Hotel" is calculated as 0.2.

According to this method of calculating the tendency of a recognition error, as the confusion score is equal to less than 1 and closer to 1, the likelihood that an utterance of a user results in a recognition error becomes higher. Then, this confusion score is used to represent the likelihood of the recognition error.

The confusion data 1050 stores the confusion scores calculated by the speech recognizer 1040. Referring to FIG. 4, a detailed description is given of this.

FIG. 4 is an explanatory diagram illustrating an example of a confusion score table 3010 according to the first embodiment of this invention.

The confusion score table 3010 contains POI names 3020, versions 3030, areas 3040, and confusion information 3050. The confusion information 3050 contains confusion POI names 3060, versions-areas 3070, and confusion scores 3080.

The POI name 3020 is a name of a POI.

The version 3030 is a version of a map containing the POI name 3020. For example, it is appreciated from the table 3010 that Tozai Byoin is contained in maps of versions 2, 3, and 4, but is not contained in a map of version 1.

The area 3040 represents an area on the map containing the POI name 3020.

The confusion information 3050 indicates POIs having a possibility of a recognition error as the POI indicated by the POI name 3020.

The confusion POI name 3060 indicates a POI name having a possibility of a recognition error.

The version-area 3070 indicates correspondences between a version and an area of the map containing the confusion POI name 3060.

The confusion score 3080 indicates a value representing a degree of tendency of the recognition error. According to the above-mentioned example of the calculation, the confusion score of the confusion POI name "Asatte Hotel" with respect to the POI name "Park Hotel" is 0.3. Moreover, the confusion score of the confusion POI name "Asatte Hotel" with respect to the POI name "Arc Hotel" is 0.2.

It should be noted that the method of calculating the confusion score described herein is merely an example. Any method may be employed as long as it can associate the tendency of a recognition error. For example, a tendency of a recognition error per phoneme may be obtained in advance, and a tendency of a recognition error per POI name may be calculated from the obtained tendency of a recognition errors per phoneme. Moreover, the speech recognition processing to be carried out by the speech recognizer 1040 may not be carried out on the server 11030, but the confusion score may be determined based on a result obtained on another computer. Further, the confusion score may be determined manually.

Moreover, the confusion score may be changed even in the case of the same POI name for some reasons. In the example illustrated in FIG. 4, the confusion score of the confusion POI name "Kasai Byoin" with respect to the POI name "Tozai Byoin" is 0.7 for versions 1 to 3, and is changed to 0.5 for version 4. The information on a change in confusion score in this manner may be recorded in the table 3010.

Moreover, speech data pieces in different noise states are stored in the speech data 1010, and the confusion score may be calculated separately for the each noise state. Moreover, on each terminal, by using a confusion score in a noise state closest to an environment in which the terminal is used, a recognition result can be corrected by a more precise tendency of a recognition error.

(Configuration of Terminal)

Figure 5:
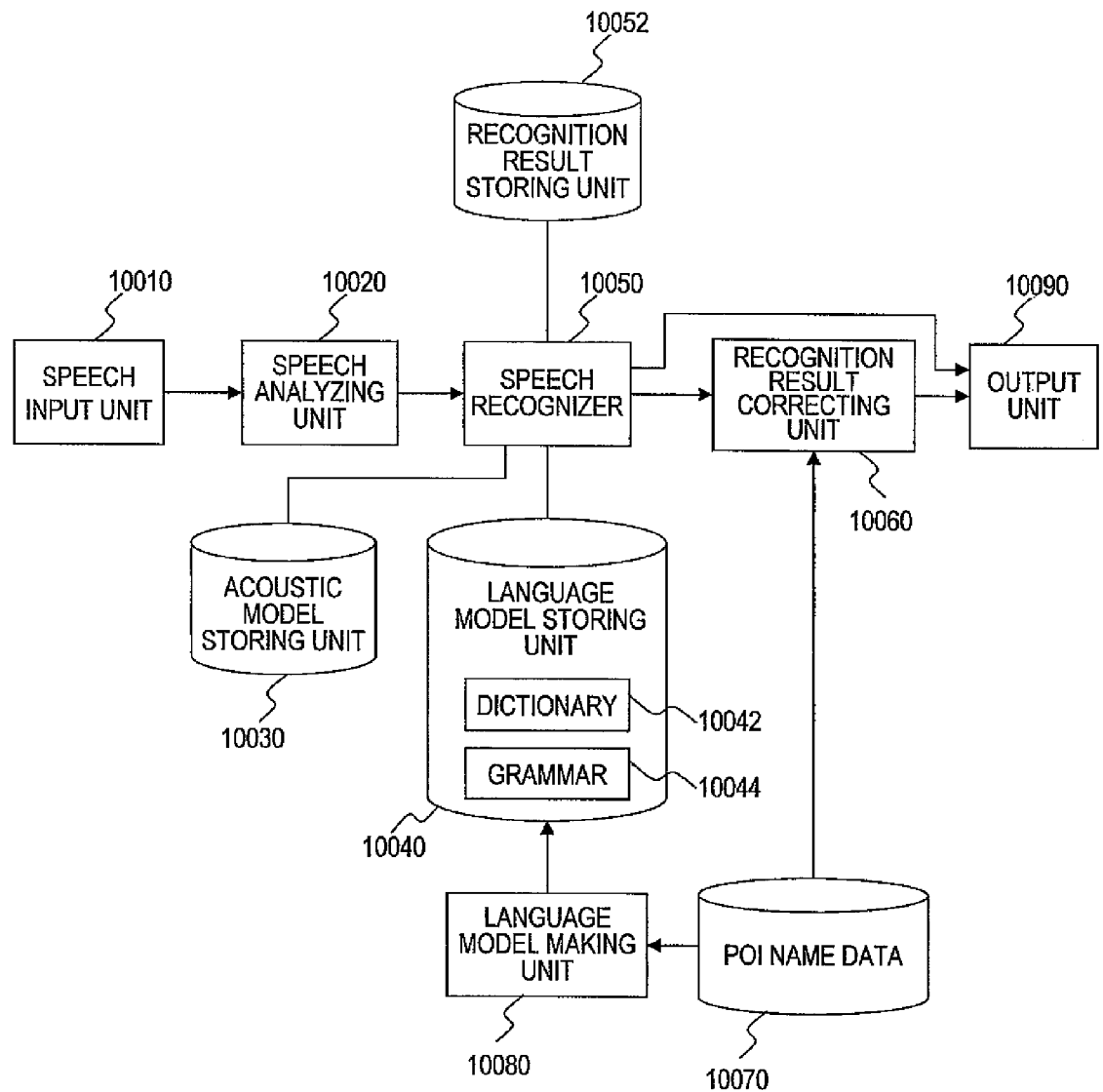
FIG. 5 is a block diagram illustrating a configuration of a speech recognition system of a terminal according to the first embodiment of this invention.

FIG. 5 is a block diagram illustrating a configuration of a speech recognition system of the terminal according to the first embodiment of this invention.

The terminal is installed on the motor vehicle 11010, includes a CPU, an output device, an input device, a network interface, a memory, and an auxiliary storage system, and communicates with the server 11030 via the network 11020.

A speech input unit 10010 converts a speech signal received from a user into a digital signal, and acquires the digital signal as speech data.

A speech analyzing unit 10020 converts the speech data acquired by the speech input unit 10010 into a sequence of feature vectors. A method of the conversion to be used may be the same as that used by the speech analyzing unit 1012 of the server 11030.

An acoustic model storing unit 10030 stores acoustic models corresponding to respective phonemes in advance. The method of storing the acoustic models to be used may be the same as that used by the acoustic model storing unit 1014 of the server 11030.

A language model storing unit 10040 stores a dictionary 10042 and a grammar 10044.

The dictionary 10042 stores words to be recognized in a speech recognizer 10050, and phoneme strings thereof. According to the first embodiment, in the dictionary 10042, words of POI names, and phoneme strings of the POI names are stored. Not all the POI names as the subject of the speech recognition may be stored in the dictionary 10042, but only POI names restricted by a position of an own motor vehicle of a user, addresses and POI categories input in advance, and the like may be stored.

The grammar 10044 stores connection rules of the respective words stored in the dictionary 10042.

The speech recognizer 10050 carries out speech recognition processing. Specifically, the speech recognizer 10050 searches an HMM network formed by connecting HMMs stored in the acoustic model storing unit 10030 according to the dictionary 10042 and connection rules of the grammar 10044 stored in the language model storing unit 10040 for a sequence of states in which a sequence of feature vectors of an input speech transferred from the speech analyzing unit 10020 is output at the highest probability. Further, the speech recognizer 10050 outputs a word sequence following the sequence of states obtained as a search result as a recognition result. Moreover, in addition to the word sequence, the speech recognizer 10050 calculates a score representing the likelihood of the word sequence as the recognition result. The speech recognition processing may be implemented by a method described in Shikano, et al., "Speech recognition system", Ohmsha, 2001. On this occasion, a word sequence having the highest score or a plurality of word sequences having higher scores from the top may be output.

A recognition result storing unit 10052 temporarily stores results output by the speech recognizer 10050. The speech recognizer 10050 may output results stored in the recognition result storing unit 10052 to a recognition result correcting unit 10060 or an output unit 10090.

The recognition result correcting unit 10060 corrects the result output by the speech recognizer 10050 based on POI name data 10070. The POI name data 10070 contains a list of POI names and confusion information on the POI names. Moreover, the POI name data 10070 contains phoneme strings representing how the POI names are read, and serves as a dictionary of speech recognition for the speech recognition system. Operations thereof are detailed later.

A language model making unit 10080 converts the phoneme strings of the POI names stored in the POI name data 10070 into a language model in a form to be used for the speech recognition, and stores the language model obtained through the conversion in the language model storing unit 10040. Though this processing of the conversion into the language model is generally carried out when the processing of the speech recognition is not carried out, the processing of the conversion into the language model may be carried out when the speech recognition processing starts or while the recognition processing is being carried out.

The output unit 10090 outputs a speech recognition result sent from the recognition result correcting unit 10060 or the speech recognizer 10050 to functions such as a screen output and a sound output of the car navigation device.

(Structure of POI Name Data 10070)

A description is given of the POI name data 10070.

Figure 6:
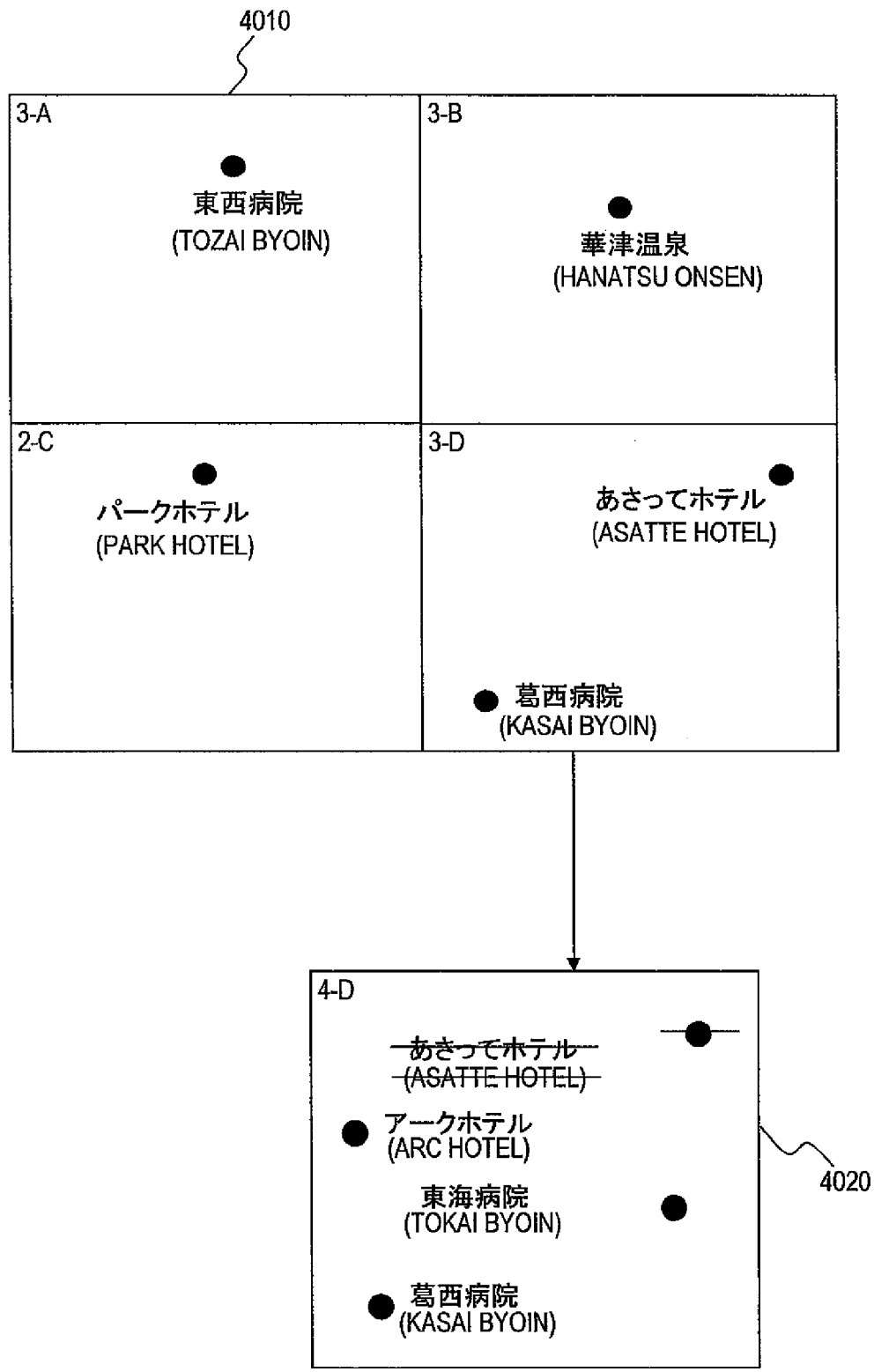
FIG. 6 is an explanatory diagram illustrating a map held in the terminal, and versions thereof according to the first embodiment of this invention.

FIG. 6 is an explanatory diagram illustrating a map 4010 held in the terminal, and versions thereof according to the first embodiment of this invention.

As illustrated in FIG. 6, the map 4010 held by the terminal is divided into areas in a mesh form, and contains four areas A to D. Moreover, versions of the areas A to D are respectively 3, 3, 2, and 3. Moreover, five POI names "Tozai Byoin", "Hanatsu Onsen", "Park Hotel", "Asatte Hotel", and "Kasai Byoin" illustrated in the map 4010 of FIG. 6 are registered. The map and the version information held by the terminal are stored as digital data in the terminal.

In this state, in the POI name data 10070, the information on the POI names loaded on the terminal and information on the POI name having a tendency to cause a recognition error by the terminal are stored.

FIGS. 10A to 10E are explanatory diagrams illustrating examples of the POI name data 10070 according to the first embodiment of this invention.

The POI name data 10070 contains POI names 8060, versions-areas 8070, and confusion information 8080. The confusion information 8080 contains confusion POI names 8090, versions-areas 8100, and confusion scores 8120.

The POI name 8060 is a POI name stored in the terminal.

The version-area 8070 indicates a correspondence between an area containing the POI name 8060 and a version number of the map. For example, Tozai Byoin is present in the area A, and the version of the area A is 3, and thus, a relationship "3-A" is stored.

The confusion information 8080 indicates POI names having a possibility of a recognition error as the POI name 8060 by the speech recognition system of the terminal.

The confusion POI name 8090 indicates POI names having a possibility of a recognition error.

The version-area 8100 indicates correspondences between a version and an area of the map containing the confusion POI name 8090.

The confusion score 8120 indicates a value representing a degree of tendency of the recognition error. For example, the Kasai. Byoin can be erroneously recognized as Tozai Byoin, and is assigned with 0.7 as the confusion score.

As a method of assigning the confusion scores, any of the methods including (1) initially assigning the confusion scores when the car navigation device is purchased, (2) assigning the confusion scores to a media such as a DVD and a CD used for updating the map, and (3) updating the confusion information when the map is updated based on a difference via the network may be employed.

To each POI name, a unique identifier of the POI, a phoneme string describing how to read the POI name, latitude and longitude of representing a position, a POI category, an address, and a phone number assigned to POIs generally on the car navigation device, and a Alphabet string referred to when the name is input using a touch panel or a remote controller, which are omitted in the POI name data 10070 according to this embodiment, may be assigned.

(Update of Confusion Information 8080)

A description is given of how to update the confusion information 8080 of the POI name data 10070 when the map held by the terminal is updated via the network 11020. As an example on this occasion, the area D of the map 4010 of FIG. 6 is updated from version 3 to version 4, resulting in a map 4020. Specifically, "Asatte Hotel" in the map 4010 is deleted, and "Tokai Byoin" and "Arc Hotel" are added.

Figure 7:
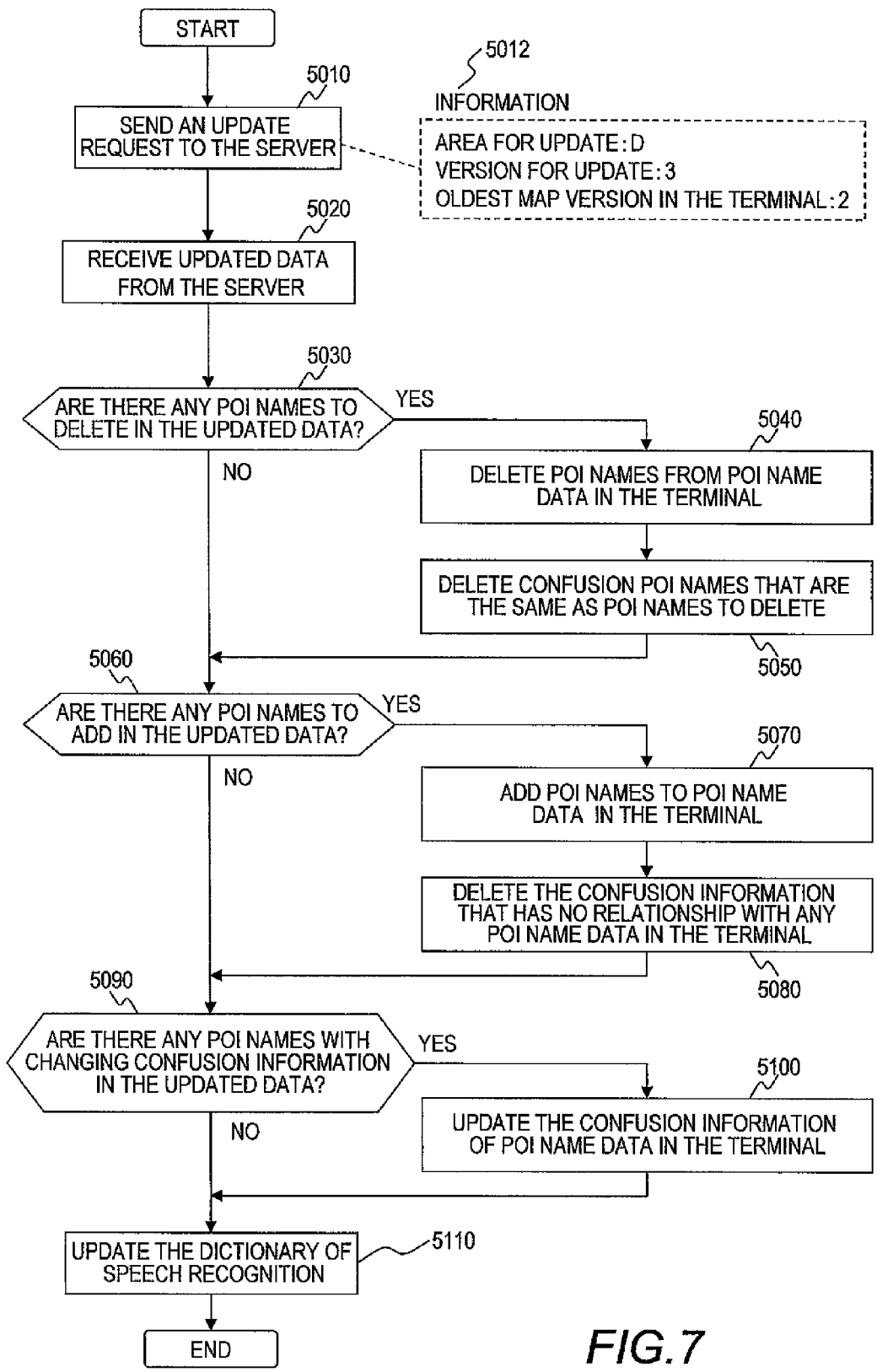
FIG. 7 is a flowchart illustrating processing performed by the terminal when map data is updated according to the first embodiment of this invention.

FIG. 7 is a flowchart illustrating processing performed by the terminal when the map data is updated according to the first embodiment of this invention.

First, in Step 5010, the terminal sends an update request of the map data to the server 11030. A timing of sending this update request is a timing at which a user explicitly instructs the update or a timing at which the terminal automatically (periodically, for example) instructs the update.

Information 5012 sent from the terminal to the server 11030 contains an area for update, a version number of the map area for update currently used by the terminal, and the oldest version number of the map used by the terminal. The area for update is the area D, and the version of the map of the area D of the terminal is 3. Thus, "3" as the version number and "D" as the area for update are sent. Moreover, in the map 4010 illustrated in FIG. 6, the oldest map version is "2" of the area C, and thus, "2" is sent as the oldest version number.

When the server 11030 receives this information 5012, the server 11030 starts the processing of the difference update.

Figure 8:
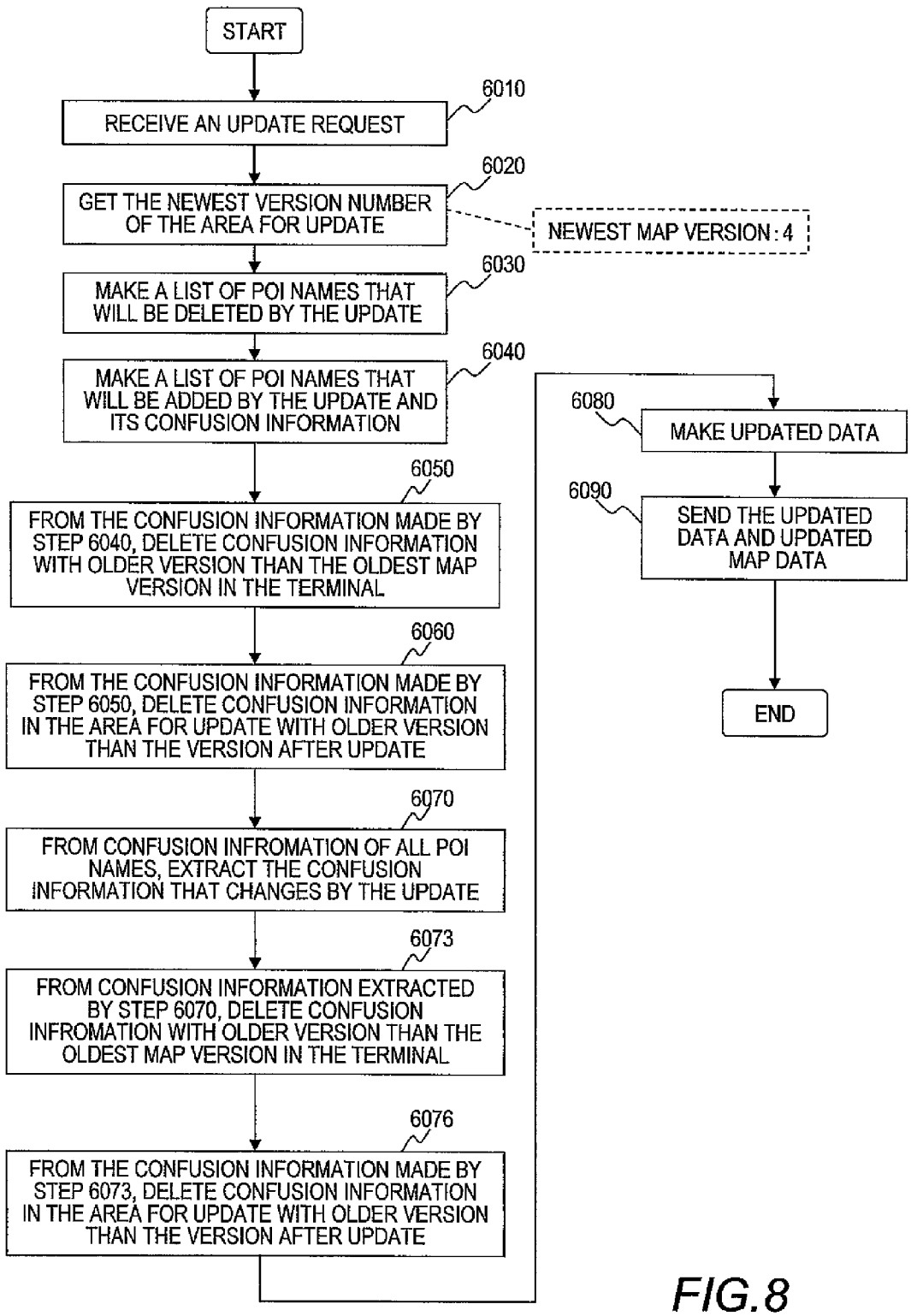
FIG. 8 is a flow chart illustrating processing performed by the server when the map data is updated according to the first embodiment of this invention.

FIG. 8 is a flow chart illustrating processing performed by the server 11030 when the map data is updated according to the first embodiment of this invention. Moreover, FIG. 9A is an explanatory diagram illustrating a table of POI name to delete 7010 included in the difference data sent from the server 11030 to the terminal according to the first embodiment of this invention, FIG. 9B is an explanatory diagram illustrating a table of POI name to add 7015 included in the difference data, and FIG. 9C is an explanatory diagram illustrating a table of information 7085 indicating POI names with changing confusion information (7085 is referred to as table of POI name with changing confusion information hereinafter), which is contained in the difference data.

The server 11030 receives, in Step 6010, the update request sent in Step 5010.

In Step 6020, the server 11030 searches the POI name data 1020 to determine the number of the latest versions of the map of the area to which the update request is directed. As a result, it is found that version 4 is the latest version. Moreover, for the update of the area D from version 3 to version 4, from data pieces registered in the server 11030, the server 11030 extracts information on deletions, additions, and changes of POIs. This information on deletions, additions, and changes of POIs is referred to as the difference data.

A description is given of a method of making the difference data starting from Step 6030. In Step 6030, the server 11030 gets a list of POI names to be deleted from the area D by the update of the map data. The list of version 3 of the POI name data 1020 is illustrated in a table 2090 of FIG. 3C, and the list of version 4 of the POI name data 1020 is illustrated in a table 2100 of FIG. 3D. When POIs to be deleted from the area D are extracted by comparing the table 2090 and the table 2100 with each other, it becomes apparent that "Asatte Hotel" is to be deleted from the area D. Therefore, "Asatte Hotel" is extracted, and the extracted POI name is stored in a temporary area of the table of POI name to delete 7010 (FIG. 9A).

In Step 6040, the server 11030 gets POI names to add to the area D by the update, and the confusion information on the POI names to add. When POIs to add to the area D are extracted by comparing the table 2090, which is the list of version 3, and the table 2100, which is the list of version 4, two POIs "Tokai Byoin" and "Arc Hotel" are extracted.

Moreover, the confusion information on "Tokai Byoin" and "Arc Hotel" is extracted from the table 3010. The extracted confusion information is temporarily stored in the table of POI name to add 7015 (FIG. 9B).

In Step 6050, from the information in the table of POI name to add 7015 extracted in Step 6040, the server 11030 deletes information older than the oldest version held by the terminal. According to the information 5012 received in Step 6010, the oldest version of the map held by the terminal is "2". Thus, information older than the version number 2 (namely version 1) is no longer necessary. Thus, from the table of POI name to add 7015, the information on POI names and confusion information relating to version 1 is deleted. Specifically, information on POIs contained only in version 1 out of the confusion information is deleted (7081). Moreover, out of version-area 7070, information relating to version 1 is deleted (7082).

In Step 6060, from information relating to the area for update (namely the area D) out of the information on the POI names to be added output in Step 6050, information older than the version delivered to the terminal next time (namely version 4) is deleted. Specifically, a POI name which had been contained only up to version 3 in the area D is deleted (7083), and information up to version 3 in the area D out of the version-area 7070 is deleted (7084).

In Step 6070, the server 11030 refers to the table 3010 and extracts confusion information that changes in all the areas as a result of the update of the POI names in the area for update (namely, due to the update from 3-D to 4-D). The extracted confusion information is temporarily stored in the table of POI name with changing confusion information 7085 (FIG. 9C).

A POI name 7090 is a POI name having confusion information to be changed due to the update of the map. It should be noted that confusion information of the POI names to be added have already been stored in the table of POI name to add 7015, and have thus been removed from the table of POI name with changing confusion information 7085.

A version 7100 and an area 7110 are respectively a version and an identifier of an area of the map containing the POI name 7090.

Confusion information 7120 is confusion information to be changed due to the update.

A kind of update 7130 is a kind of the update indicated by the updated data. Specifically, there are three kinds: add, update, and delete.

A confusion POI name 7140 is a POI name which the speech recognition system tends to cause a recognition error.

A version-area 7150 indicates a correspondence between a version and an area of a map containing the confusion POI name 7140.

A confusion score 7160 is a confusion score of the confusion POI name 7140.

In Step 6073, out of the information output in Step 6070, the server 11030 deletes confusion information older than the oldest map version held by the terminal. The oldest map version in the terminal is "2", and information on the POI name "Tozai clinic" present only in versions (namely version 1) older than the oldest map version is deleted (7170).

In Step 6076, from information relating to the area for update (namely the area D) out of the information output in Step 6073, information older than the version delivered to the terminal next time (namely version 4) is deleted. Specifically, the version of the area for update D is "4", and thus, information on "Asatte Hotel" contained only up to version 3 in the area D is deleted (7180).

In Step 6080, updated data to be sent to the terminal is made. The updated data to be sent includes the table of POI name to delete 7010, the table of POI name to add 7015, and the table of POI name with changing confusion information 7085.

To each of the POI names contained in the updated data, a unique identifier of the POI may be added, which is omitted herein. Moreover, the table of POI name to add 7015 may also include a phoneme string describing how to read the POI name, latitude and longitude representing a position, a POI category generally assigned to the POI on the car navigation device, an address, a phone number, and a Alphabet string referred to when the name is input using a touch panel or a remote controller.

In Step 6090, the extracted updated data and the map data for which the update request is received in Step 6010 are sent to the terminal.

Referring again to FIG. 7, a description is given of processing, on the terminal, of the updated data sent from the server 11030.

In Step 5020, the terminal receives the updated data sent from the server 11030.

In Step 5030, the terminal refers to the received updated data, and determines whether there are POI names to delete from the POI name data 10070 of the terminal. In this example, the table of POI name to delete 7010 contains "Asatte Hotel", and thus the terminal proceeds to Step 5040.

In Step 5040, the terminal deletes the POI name 8060 to delete from the POI name data 10070. Referring to FIGS. 10A to 10D, this operation is described.

A table 8010 in FIG. 10A illustrates the POI name data 10070 before the update.

From the POI name data 10070, "Asatte Hotel" contained in the POI names 8060 is searched for, and is deleted (8022).

In Step 5050, the terminal searches the confusion POI names 8090 contained in the confusion information 8080 for the POI name 8060 to delete, and deletes the POI name 8060 (8024). As a result, the POI name data 10070 is now represented by a table 8020 illustrated in FIG. 10B.

In Step 5060, the terminal refers to the updated data, and determines whether there are POI names to add to the POI name data 10070 of the terminal. In this example, the table of POI name to add 7015 exists, and thus the terminal proceeds to Step 5070.

In Step 5070, the terminal adds the POI names 7020 to add to the POI name data 10070. There are two POI names 7020 to add: "Tokai Byoin" and "Arc Hotel", and thus, they are added (8032). On this occasion, the POI names to add are preferably added also to the dictionary 10042.

Moreover, on this occasion, the version of the POI names which are contained in the area D, and are not to be changed is updated (8034). As a result, the POI name data 10070 is now represented by a table 8030 illustrated in FIG. 10C.

In Step 5080, the terminal deletes, from the confusion information 7050 assigned to the table of POI name to add 7015, information that has no relationship with any POI name data in the terminal (8043, 8046). As a result, the POI name data 10070 is now represented by a table 8040 illustrated in FIG. 10D.

In Step 5090, the terminal determines whether there is confusion information 8080 to be changed out of the confusion information assigned to the existing POI names 8060. In this example, the table of POI name with changing confusion information 7085 exists. Thus, the terminal proceeds to Step 5100.

In Step 5100, based on the table of POI name with changing confusion information 7085 sent from the server 11030, the terminal changes the POI name data 10070. For example, the table of POI name with changing confusion information 7085 contains data indicating a change by adding the confusion POI name "Tokai Byoin" to the POI name "Tozai Byoin", and thus, this confusion POI name is added to the POI name data 10070. Moreover, there is also data indicating a change to the confusion score 8120 of the POI name "Kasai Byoin", and, based on this data, the confusion, score 8120 of the POI name data 10070 is changed. Moreover, the data sent from the server 11030 contains the POI names 7090 which are not held by the terminal. These POI names 7090 are not added in Step 5100. Specifically, though "Tohachi Byoin" is contained in version 4 of the area A, the area A is version 3 on the terminal, and thus this POI name is not added to the POI name data 10070 (delete 8056). As a result, the POI name data 10070 is now represented by a table 8050 illustrated in FIG. 10E.

In Step 5110, the terminal updates the speech recognition language model 10040 of the terminal so as to recognize the new POI names. Specifically, the terminal uses phoneme strings to which pronunciations of the POI names 8060 of the POI name data 10070 are registered, to thereby make a language model in a form to be read by the speech recognizer 10050.

(Description of Interaction/Operation of Recognition Result Correcting Unit)

Next, a description is given of a correction of a recognition result based on the confusion information when a user actually inputs a POI name.

Figure 11:
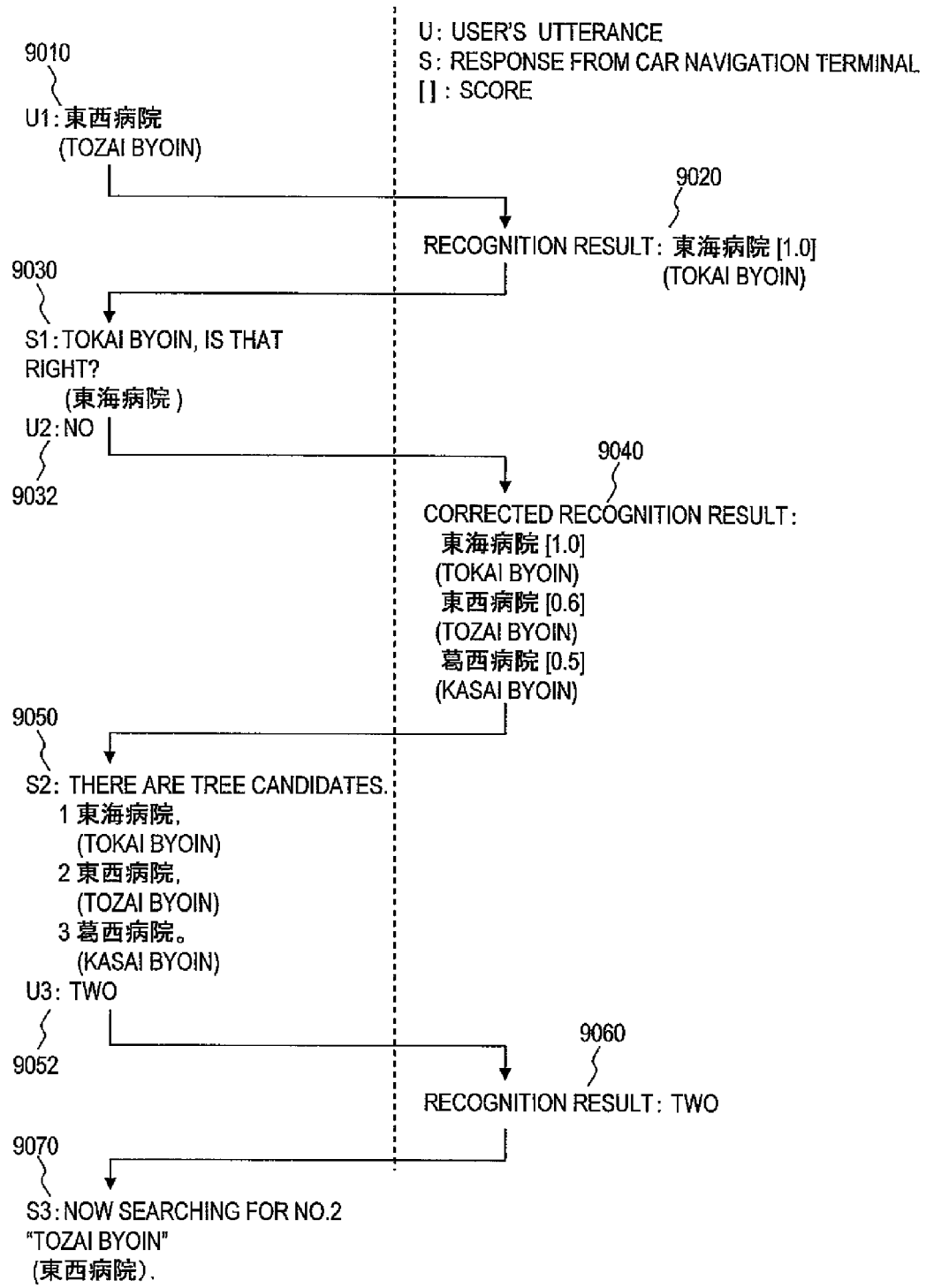
FIG. 11 is an explanatory diagram illustrating an example of an interaction between a user and the terminal according to the first embodiment of this invention.

FIG. 11 describes an example of an interaction between a user and the terminal according to the embodiment of this invention.

The user utters, as an instruction 9010, "Tozai Byoin" to the terminal.

In Step 9020, first, the terminal carries out the speech recognition in response to the user utterance. For the speech recognition, the speech recognition system illustrated in FIG. 5 is used, and a word sequence as a recognition result and a score representing a likelihood thereof are output. As a result, the speech recognizer 10050 makes a recognition error, and outputs a result "Tokai Byoin" at a score 1.0. This result is stored in the recognition result storing unit 10052. Moreover, this result is sent to the output unit 10090. The output unit 10090 sends the result to a screen, a speech synthesizer, and other modules of the terminal. As a result, the terminal returns a response "Tokai Byoin, is that right?" to the user (9030).

In response to this question, it is assumed that the user utters "No" because an unintended result has been returned (instruction 9032). This speech is recognized by the speech recognition system of FIG. 5, and the terminal recognizes that the result is not accepted.

Then, the speech recognizer 10050 extracts the previous recognition result "Tokai Byoin" from the recognition result storing unit 10052, and sends the result to the recognition result correcting unit 10060.

The recognition result correcting unit 10060 refers to the POI name data 10070 stored in the terminal, thereby referring to confusion information corresponding to the name "Tokai Byoin". On this occasion, it is assumed that the POI name data 10070 is in the state of the table 8050 illustrated in FIG. 10E. Referring to the table 8050, "Tozai Byoin" and "Kasai Byoin" are corresponding confusion POI names 8090. Moreover, their confusion scores 8120 are respectively 0.6 and 0.5.

Based on this result, the recognition result correcting unit 10060 adds "Tozai Byoin" and "Kasai Byoin" to the original recognition result "Tokai Byoin" as candidates of the recognition result. Moreover, the scores of the "Tozai Byoin" and the "Kasai Byoin" are corrected respectively to 0.6 and 0.5 by multiplying the score 1.0 of the original recognition result "Tokai Byoin" by the respective confusion scores 8120. The recognition result correcting unit 10060 sends these three POI names to the output unit 10090. The output unit 10090 sends the result to a screen, a speech synthesizer, and other modules of the terminal. Then, the terminal outputs a response "There are three candidates. 1 Tokai Byoin, 2 Tozai Byoin, 3 Kasai Byoin" to the user (response 9050).

In response to this output, when a sound "Two" is input from the user (instruction 9052), the terminal selects the second "Tozai Byoin" (Step 9060), and sends the selection to the screen, the speech synthesizer, and other modules of the terminal (response 9070). As a result, the user may input the desired POI name.

Hereinabove, the flow of the steps according to the first embodiment has been described, but the method of interaction between the user and the terminal is not limited to the method according to the first embodiment. In an alternative method, the speech recognition result step by the terminal (9020) may be immediately sent to the recognition result correcting unit 10060 to thereby increase the number of candidates. In this case, there may be adopted a configuration in which the recognition result storing unit 10052 is removed from the speech recognition system of the terminal.

Moreover, as long as the tendency of recognition error is employed, the method is not limited to the method according to the first embodiment. For example, as the confusion information, a score is calculated when speech data of an uttered certain POI name is recognized by using a dictionary of a correct POI name, a score is calculated when the speech data is recognized by using a dictionary of a different POI name, and a mean difference of the calculated scores is directly used as the confusion information. Moreover, according to the mean difference, a method of correcting a score of a recognition result, or increasing the number of words output as a result may be employed. Moreover, this can be applied to various methods in which confusion information is added when the difference update is carried out.

Moreover, how to use the confusion score or the score output by the speech recognizer is not specifically described in the first embodiment, but this can be applied to various control methods based on an interaction employing the score of the recognition result.

In the example of the interaction described in the first embodiment, in the response 9050, all the candidates are read as output. Another possible method is to refer, when the user utters "No", to a POI name having the next highest score, thereby asking the user whether this POI name is an intended POI name. In other words, when the user utters "No", the terminal refers to Tozai Byoin having the next highest score, thereby generating a response "Tozai Byoin, is that right?". Further, when the user utters "No", the terminal uses Kasai Byoin having the next highest score, thereby generating a response "Kasai Byoin, is that right?".

As a still alternative method, out of a plurality of POI name candidates obtained according to the confusion information, based on history of use of the motor vehicle by the user, a POI name which the user selects with the highest probability may be output to the user.

According to the first embodiment of this invention, when the map data has been changed, the dictionary on the terminal can be updated using limited computer resources (such as a CPU and a memory) and resources of the network. Moreover, the terminal obtains the tendencies of recognition errors, and thus, a result desired by a user can quickly be obtained from the speech recognition system.

In the difference update of the dictionary, similarly to an ordinary update of a map, a method of only adding and deleting words in the dictionary is conceivable. However, a speech uttered by a user who wants to go to "Tozai Byoin" may be erroneously recognized as "Tokai Byoin" which is a POI name added as a result of an update. Moreover, conversely, even when a user utters a POI name which is newly added, the utterance may be erroneously recognized as another existing POI name.

In order to address this situation, if the terminal had a high computer processing performance, the speech recognizer could output a plurality of results, and could output, as a candidate, the correct name "Tozai Byoin". However, the terminal has the limited computer resources, and the number of candidates to be output is thus limited.

Even in this case, according to the method described in the first embodiment, the correct name can be included in candidates.

Moreover, when the confusion information is downloaded in the difference update, it is difficult to download the confusion information on all the POIs due to the enormous data traffic. According to the first embodiment, by downloading the confusion information only on the POIs to be updated, the data traffic can be reduced. Moreover, on the terminal, by also updating the confusion information on existing POI names having the tendencies of recognition errors influenced by the POIs to be updated, it is possible for the terminal to obtain more precise tendencies of recognition errors.

Second Embodiment

Difference Data excluding Confusion Scores of Words which cause Recognition Errors According to a second embodiment, assumptions of the update are the same as those of the first embodiment. The second embodiment is different from the first embodiment in two points: (1) the table of POI name with changing confusion information (7085) illustrated in FIG. 9C among the confusion information sent from the server 11030 is not sent; and (2) the processing in Step 5100 performed by the terminal illustrated in FIG. 7 is different. In this embodiment, in Steps 5090 and 5100 in which the confusion information on the POI names is updated on the terminal, the confusion information on the added POI names is used.

Figure 13:
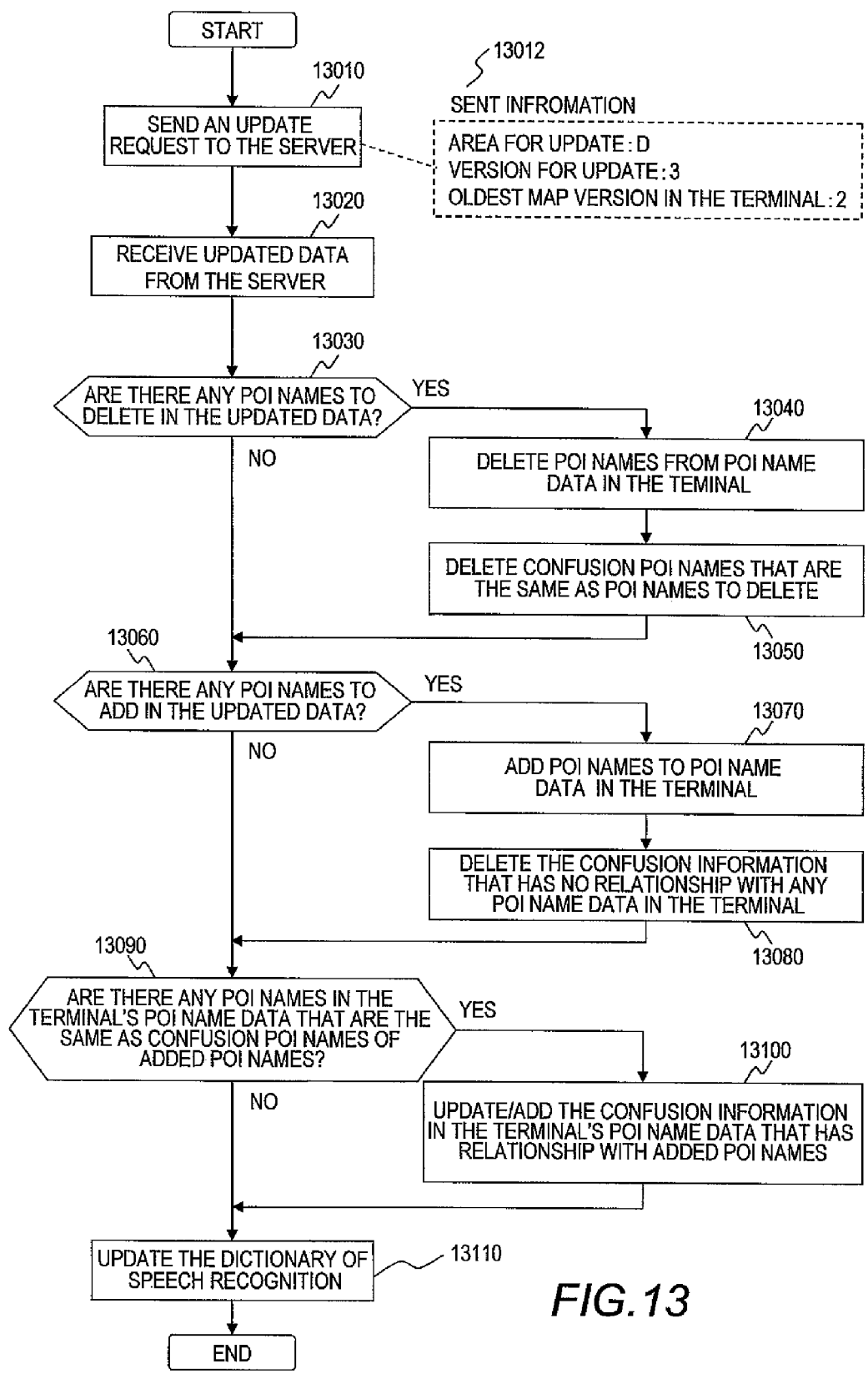
FIG. 13 is a flowchart illustrating processing carried out by the terminal when the map data is updated according to the second embodiment of this invention.

FIGS. 12A and 12B are explanatory diagrams illustrating examples of the POI name data 10070 according to the second embodiment of this invention. FIG. 13 is a flowchart illustrating processing carried out by the terminal when the map data is updated according to the second embodiment of this invention.

Steps 13010 to 13080 of FIG. 13 are the same as Steps 5010 to 5080 of FIG. 7, and hence description thereof is omitted.

Changes of the POI name data as a result of Steps 13090 and 13100 are illustrated in FIGS. 12A and 12B. A table 12010 illustrated in FIG. 12A is the same as the table 8040 of the POI name data in midstream of the update illustrated in FIG. 10D. It should be noted that the deletion 8043 and the deletion 8046 of the confusion information represented by strikethroughs in the table 8040 have already been removed from the table 12010.

Referring to the confusion POI names of the added POI names "Tokai Byoin" and "Arc Hotel", "Tozai Byoin" and "Kasai Byoin" are described as confusion POI names of "Tokai Byoin", and "Park Hotel" is described as a confusion POI name of "Arc Hotel". Confusion scores are assigned respectively thereto.

Then, combinations which are the inverses of the correspondences between the added POI name and the confusion POI name, namely, existing POI name is same as confusion POI name of the added POI name, are searched for, and when such POI names are found (Step 13090), to the confusion information of the existing POI names, the added confusion POI names are added as confusion POI names and their corresponding confusion scores are added, or the confusion scores of the confusion information of the existing POI names are updated (Step 13100). The POI name data after the update is illustrated in a table 12020 (FIG. 12B). For example, a POI name "Arc Hotel" has a confusion POI name "Park Hotel", and the confusion score is 0.2. Based on this correspondence, a POI name "Park Hotel" is searched for, and, as confusion information thereof, a confusion POI name "Arc Hotel" is added, and the confusion score of "Arc Hotel" is set to 0.2. In the same way, based on the added POI name "Tokai Byoin", confusion information is added by the same processing.

When Step 13100 is completed or there are no POI names meeting the condition in Step 13090, the processing proceeds to Step 13110. Step 13110 is the same as Step 5110 of FIG. 7, and the subsequent steps are the same as those of the first embodiment. Hence, a detailed description thereof is omitted.

The second embodiment employs the method in which the server does not send the confusion information on existing POI names to the terminal. In this case, based on an empirical rule that, generally, when a speech of a word A is erroneously recognized as a word B, a speech of the word B may be erroneously recognized as the word A, when a correspondence between a POI name and a confusion POI name is same, the same confusion score can be assigned to a confusion POI name in a correspondence in which the POI name appears as the confusion POI name and the confusion POI name appears as a POI name.

Thus, the server does not send the confusion information on existing POI names to the terminal, the data traffic is further reduced, use of resources can be reduced, and the confusion information can be efficiently updated.

Moreover, the description of the second embodiment is given of the case in which, based on the table of POI name to add sent from the server, the confusion information pieces of the existing POI names are updated. However, the existing POI names may be updated previously. In this case, the original confusion information may not be overwritten, and may be maintained.

(Applications to Configurations without Network)

The descriptions of the first and second embodiments are given of the case in which the server and the terminal have configurations independently of each other.

However, it is not essential to separate the server and the terminal, and the configurations of FIGS. 2 and 5 may be provided on the same terminal.

Moreover, when the confusion information is updated, the communication over the network may not be employed. For example, in the first and second embodiments, in place of the update using the information downloaded from the server through the communication, information recorded on a disk medium such as a DVD may used for the update. The data on this medium may be input to the auxiliary storage system via the input device of the terminal, thereby reading out the same information as that downloaded from the server in the first and second embodiments from the DVD, and updating the POI name data containing the confusion information, and the language model.

(Applications to Update of Data Other than Map)

Moreover, the descriptions of the first and second embodiments are given of the update of map data. However, this invention can be applied to data other than the map, which may be partially updated. For example, the POI name data in a state without the latitude and longitude may be used as a simple POI name list. Moreover, this invention may be applied to data of music pieces which can be listened to on a car audio device.

While the present invention has been described in detail and pictorially in the accompanying drawings, the present invention is not limited to such detail but covers various obvious modifications and equivalent arrangements, which fall within the purview of the appended claims.

What is claimed is:

1. A speech recognition system installed in a terminal coupled to a server via a network, wherein:
   the terminal holds map data including a landmark;
   the speech recognition system manages recognition data including a word corresponding to a name of the landmark included in the held map data, and sends update area information indicating an area of the map data to be updated and update data on the area indicated by the update area information to the server;
   the server is configured to:
      generate, in a case of which recognition data of the area indicated by the update area information sent from the terminal has been changed, after a time indicated by the update data sent from the terminal, difference data between latest recognition data and recognition data corresponding to the area indicated by the update area information at a time indicated by the update data; and
      send the generated difference data to the terminal along with map data on the area indicated by the update area information;
   the terminal updates the map data held in the terminal based on the map data sent from the server; and
   the speech recognition system updates the recognition data managed by the terminal based on the difference data sent from the server;
   wherein:
   the recognition data includes confusion information, the confusion information including a confusion word having a tendency to cause a recognition error with the word corresponding to a name of the landmark, and a confusion score which represents the tendency of the confusion word to cause recognition error;
   the server sends the difference data including the confusion information to the terminal; and
   the speech recognition system updates the confusion information included in the recognition data held by the terminal based on the confusion information sent from the server.

2. The speech recognition system according to claim 1, wherein, in a case of which a word included in the confusion information sent from the server is included in confusion information for a different area, the speech recognition system is configured to update confusion information for the different area which corresponds to the word.

3. The speech recognition system according to claim 1, which is configured to:
   refer to the confusion information based on a recognition result of a speech uttered by a user; and
   correct the recognition result based on the referred confusion information.

4. The speech recognition system according to claim 3, which is configured to:
   refer to confusion information based on a recognition result of a speech uttered by a user;
   add, in a case of which the referred confusion information includes a word having a tendency to cause a recognition error, the word having a tendency to cause a recognition error to the recognition result, and
   determine a score of the word having a tendency to cause a recognition error based on the confusion score.

5. The speech recognition system according to claim 4, which is configured to change the recognition result to be output based on the determined score of the word.

6. The speech recognition system according to claim 1, wherein:
   the server extracts confusion information on a word having a tendency to cause a recognition error with a word included in the difference data, and sends the extracted confusion information as confusion subject information to the terminal; and
   the speech recognition system updates the confusion information managed by the terminal based on the confusion subject information sent from the server.

7. The speech recognition system according to claim 1, wherein the speech recognition system is configured to:
   extract confusion information on a word having a tendency to cause a recognition error with a word included in the confusion information sent from the server; and
   set the confusion score of the extracted confusion information to confusion information based on a case wherein the word having a tendency to cause a recognition error is recognized correctly.

8. A data updating method for a terminal coupled to a server via a network,
   the terminal including a speech recognition system and holding map data including a landmark,
   the speech recognition system managing recognition data including a word corresponding to a name of the landmark included in the held map data, the data update method comprising the steps of:
   sending, by the terminal, update area information indicating an area of the map data to be updated, and update data on the area to be updated to the server;
   generating, by the server, in a case of which recognition data of the area indicated by the update area information sent from the terminal has been changed, after a time point indicated by the update data sent from the terminal, difference data between latest recognition data and recognition data corresponding to the area indicated by the update area information at a time indicated by the update data;
   sending, by the server, the generated difference data to the terminal along with map data on the area indicated by the update area information;
   updating, by the terminal, the map data held in the terminal based on the map data sent from the server; and
   updating, by the terminal, the managed recognition data based on the difference data sent from the server;
   wherein:
   the recognition data includes confusion information, the confusion information including a confusion word having a tendency to cause a recognition error with the word corresponding to a name of the landmark, and a confusion score which represents the tendency of the confusion word to cause recognition error;
   the server sends the difference data including the confusion information to the terminal; and
   the method further comprises the step of updating, by the terminal, the confusion information included in the recognition data held by the terminal based on the confusion information sent from the server.

9. The data updating method according to claim 8, further comprising the step of updating, by the terminal, in a case of which a word included in the confusion information sent from the server is included in confusion information for a different area, confusion information for the different area corresponding to the word.

10. The data updating method according to claim 8, further comprising the steps of:
  referring to, by the terminal, the confusion information based on a recognition result of a speech uttered by a user; and
  correcting, by the terminal, the recognition results based on the referred confusion information.

11. The data updating method according to claim 10, further comprising the steps of:
  referring to, by the terminal, the confusion information based on a recognition result of a speech uttered by a user;
  adding, by the terminal, in a case of which the referred confusion information includes a word having a tendency to cause a recognition error, the word having a tendency to cause a recognition error to the recognition result, and
  determining, by the terminal, a score of the word having a tendency to cause a recognition error based on the confusion score.

12. The data updating method according to claim 11, further comprising the step of changing, by the terminal, the recognition result to be output based on the score of the word determined based on the confusion score.

13. The data updating method according to claim 8, further comprising the steps of:
  extracting, by the server, confusion information on a word having a tendency to cause a recognition error with a word included in the difference data, and sending the extracted confusion information as confusion subject information to the terminal; and
  updating, by the terminal, the managed confusion information based on the confusion subject information sent from the server.

14. The data updating method according to claim 8, further comprising the steps of:
  extracting, by the terminal, confusion information on a word having a tendency to cause a recognition error with a word included in the confusion information sent from the server; and
  setting, by the terminal, the confusion score of the extracted confusion information to confusion information based on a case wherein the word having a tendency to cause a recognition error is recognized correctly.

15. A speech recognition apparatus, comprising:
  a server; and
  a terminal, coupled to a server via a network, that stores map data including a landmark, the terminal being configured to manage recognition data, and configured to send, to the server, update area information indicating an area of the map data to be updated, and update data on the area indicated by the update area information;
  wherein the recognition data includes a word corresponding to a name of the landmark included in the map data, and the recognition data also includes confusion information, the confusion information including a confusion word having a tendency to cause a recognition error with the word corresponding to a name of the landmark, and a confusion score which represents the tendency of the confusion word to cause recognition error;
  wherein when recognition data of the area indicated by the update area information sent from the terminal has been changed, after a time indicated by the update data sent from the terminal:
    the server is configured to generate difference data between latest recognition data and recognition data corresponding to the area indicated by the update area information at a time indicated by the update data, and then to send the generated difference data, including confusion information, to the terminal, along with map data on the area indicated by the update area information;
    the terminal is configured to update the map data stored in the terminal based on the map data sent from the server, to update the recognition data managed by the terminal based on the difference data sent from the server, and to update the confusion information included in the recognition data stored by the terminal based on the confusion information sent from the server.

16. The speech recognition apparatus according to claim 15,
  wherein when a word included in the confusion information sent from the server is included in confusion information for a different area, the terminal is configured to update confusion information for the different area which corresponds to the word.

17. The speech recognition apparatus according to claim 15, wherein the terminal is further configured to:
  refer to the confusion information based on a recognition result of a speech uttered by a user; and
  correct the recognition result based on the referred confusion information.

18. The speech recognition apparatus according to claim 17, wherein the terminal is further configured to:
  refer to confusion information based on a recognition result of a speech uttered by a user;
  add, when the referred confusion information includes a word having a tendency to cause a recognition error, the word having a tendency to cause a recognition error to the recognition result;
  determine a score of the word having a tendency to cause a recognition error based on the confusion score; and
  change the recognition result to be output based on the determined score of the word.

19. The speech recognition apparatus according to claim 15,
  wherein the server is configured to extract confusion information on a word having a tendency to cause a recognition error with a word included in the difference data, and to send to the terminal the extracted confusion information as confusion subject information; and
  wherein the terminal is configured to update the confusion information managed by the terminal, based on the confusion subject information sent from the server.

20. The speech recognition apparatus according to claim 15, wherein the speech recognition system is configured to:
  extract confusion information on a word having a tendency to cause a recognition error with a word included in the confusion information sent from the server; and
  set the confusion score of the extracted confusion information to confusion information based on a case wherein the word having a tendency to cause a recognition error is recognized correctly.

* * * * *